No. 802,892. PATENTED OCT. 24, 1905.
C. S. SHARP.
HARVESTER REEL.
APPLICATION FILED JUNE 16, 1905.
2 SHEETS—SHEET 1.
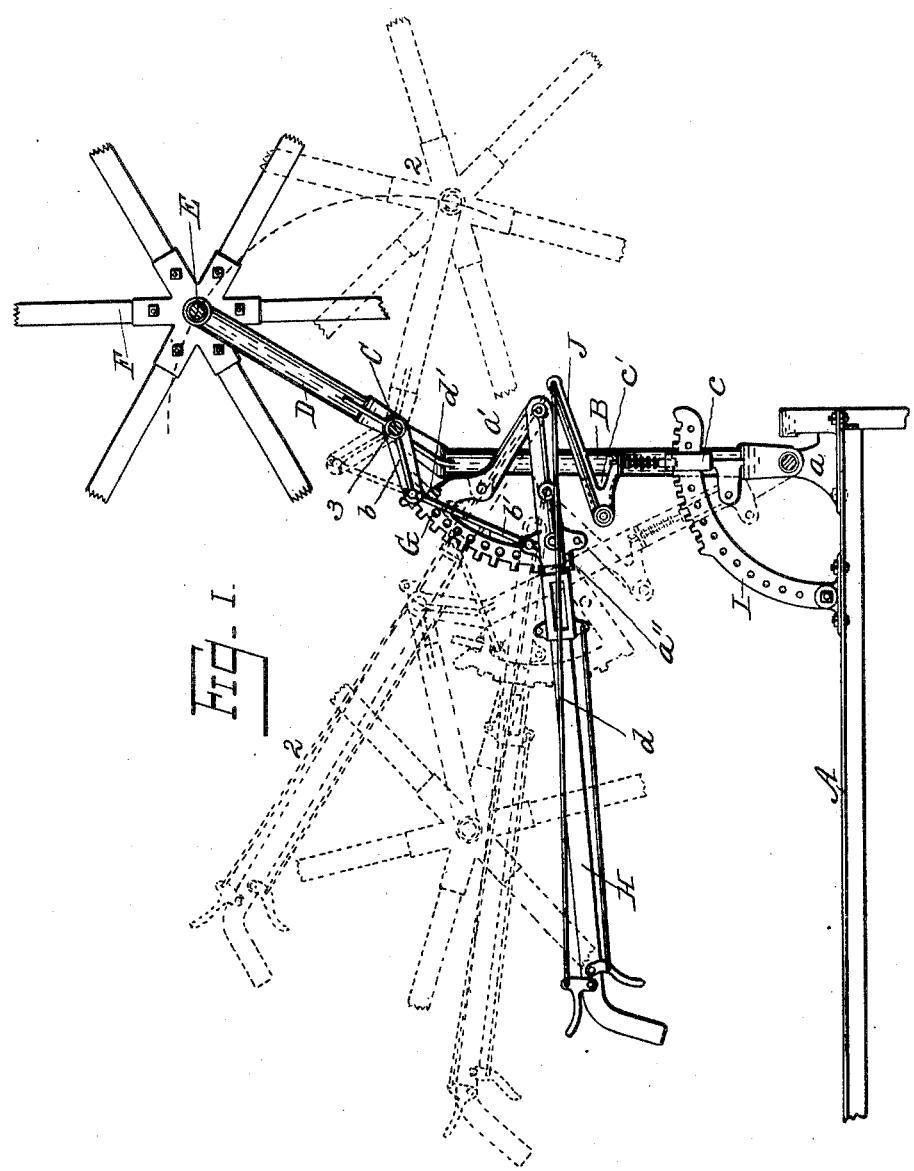
WITNESSES.
Elmer W. Stupp
Leslie J. Robbins.
INVENTOR.
Charles S. Sharp
by W. C. Jordinston
his ATTORNEY
ANDREW B. GRAHAM CO. PHOTO-LITHOGRAPHERS, WASHINGTON, D. C.

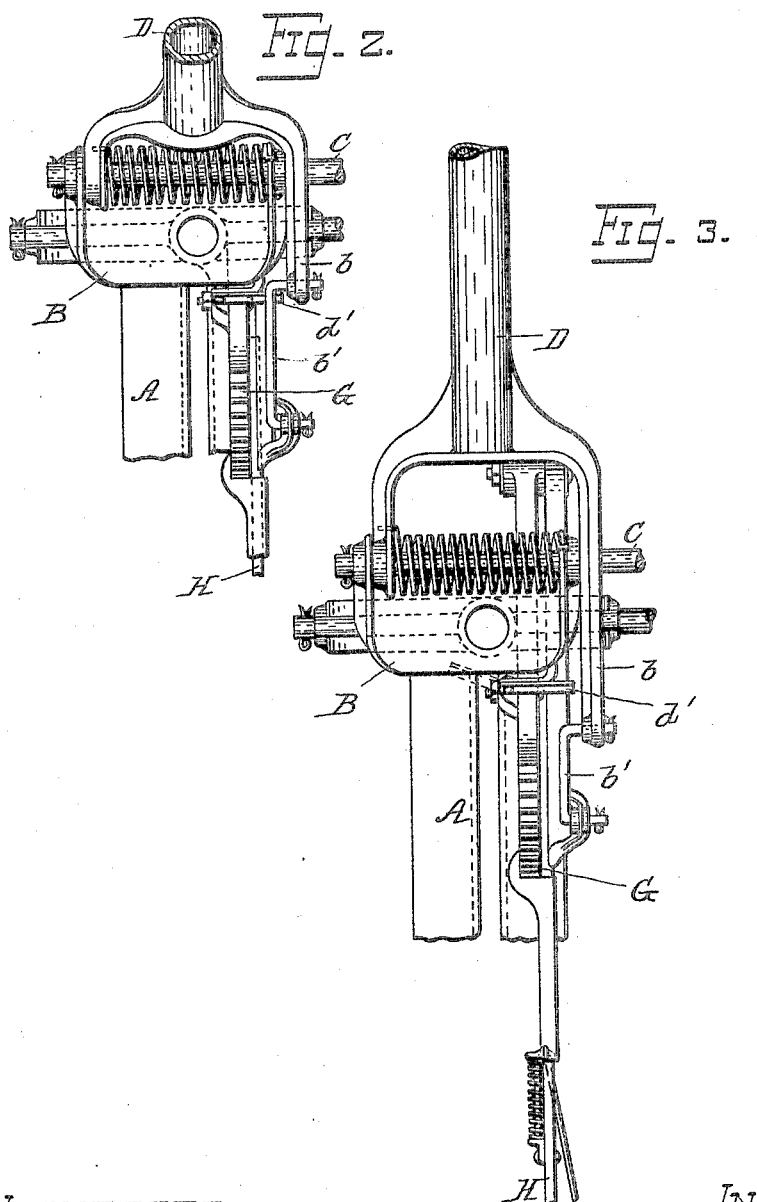

UNITED STATES PATENT OFFICE.

CHARLES S. SHARP, OF AUBURN, NEW YORK.

HARVESTER-REEL.

No. 802,892.  Specification of Letters Patent.  Patented Oct. 24, 1905.

Application filed June 16, 1905. Serial No. 265,590.

*To all whom it may concern:*

Be it known that I, CHARLES S. SHARP, a citizen of the United States, residing at Auburn, in the county of Cayuga and State of New York, have invented certain new and useful Improvements in Harvester-Reels, of which the following is a specification.

My invention relates to that class of reels for harvesters in which the reel is adjusted according to the work required of it and is capable of being thrown from its working position to a point within the limits of the frame of the harvester for storage or transportation purposes.

In the accompanying drawings, Figure 1 is a side elevation of the reel and its supporting and adjusting mechanism, showing various positions in dotted lines. Fig. 2 is a plan view with some of the parts broken away, showing the reel in its position against the limiting-dog, as shown in the full lines of Fig. 1; and Fig. 3 is a similar view, the reel being in a lower forward position, as shown by the dotted lines indicated by 2 in Fig. 1.

In the drawings, A is the seat-supporting bar of a harvester and binder having fixed to the forward end a casting $a$, upon which is pivotally mounted a standard B, its bifurcated upper end bent forwardly and forming bearings for a horizontal rock-shaft C. A reel-arm D, carrying a shaft E, on which is mounted the reel F, is journaled on the rock-shaft C. A quadrant G is secured to the upper part of the standard B and has radial arms $a'$ $a''$, at the juncture of which is pivoted a hand-lever H.

The reel-arm D is bifurcated at its lower end, as shown in Figs. 2 and 3, one of the bifurcations $b$ being elongated and at an angle to the reel-arm, a link $b'$ connecting it with the hand-lever H. Attached to the seat-supporting bar A is a quadrant I, the upper end projecting through a guide $c$ on the standard B. A bell-crank J is pivotally mounted on a bracket $c'$ on the standard B, the longer arm of the bell-crank being connected to a thumb-latch on the hand-lever H by a rod $d$. An ordinary spring-controlled plunger-bolt engages with the teeth on the quadrant I and is attached to the lower and shorter arm of the bell-crank J. On the upper part of the quadrant G is pivoted a dog $d'$, the use of which is more fully hereinafter explained.

When the machine is in use in the field, the reel is adjusted to the various positions required for a proper presentation to the cutting mechanism of the growth being harvested. In transporting the machine from place to place or when storing it it is desirable that the reel be moved within the limits of the machine. To accomplish this, I first raise the lever and lower the reel to the positions shown at 2 in dotted lines, Fig. 1, and then giving the lever a quick downward movement the reel is swung upward and rearward with sufficient force to carry it and the reel-arm D rearward of the pivotal point 3 on the standard B. Then by disengaging the plunger-bolt with the quadrant I the standard B can be rocked rearwardly, bringing the reel into position for storage or transportation, as shown in dotted lines, Fig. 1.

When operating the machine in the harvest, it is often necessary to raise the reel quickly, and in doing so unless care is exercised the reel is liable to be thrown to the rear, as for purposes of transportation, with the possibility of striking the driver. To overcome this difficulty, I provide the dog or stop $d'$, pivoted on the upper part of the quadrant G and arranged to be moved into or out of engagement with the link $b'$.

When the dog $d'$ is in the position as shown in full lines in the drawings, the upward and rearward movement of the reel-arm on its pivot is limited by the link $b'$ coming in contact with the dog $d'$, so that any further rearward movement of the reel will be governed by the movement of the standard B. When the dog $d'$ is thrown back, as shown in dotted lines, Fig. 3, the reel can be swung rearward as far as may be desired.

Having thus described my invention, what I claim as new, and desire to cover by Letters Patent, is—

1. In a harvester, the combination of a standard, a reel-arm pivotally joined thereto, a lever to control said reel-arm, and means independent of the lever to limit the rearward movement of the reel-arm on its pivot.

2. In a harvester, the combination of a standard, a reel-arm pivotally joined thereto, a lever to control said reel-arm, and a movable stop independent of the lever to limit the rearward movement of the reel-arm on its pivot.

3. In a harvester, the combination of a standard, a reel-arm pivotally joined thereto, a quadrant on the standard, a lever engaging with the quadrant, and a movable stop on the quadrant independent of the lever to limit the rearward movement of the reel-arm on its pivot.

4. In a harvester, the combination of a rocking standard, a reel-arm pivotally joined thereto, a quadrant on the standard a lever engaging with the quadrant and connected to the reel-arm, and a movable stop on the quadrant independent of the lever to limit the rearward movement of the reel-arm on its pivot.

5. In a harvester, the combination of a rocking standard, a reel-arm pivotally joined thereto, a quadrant on the standard, a lever engaging with the quadrant, a link connecting the lever and reel-arm, and a stop to contact with the link to limit the rearward movement of the reel-arm on its pivot.

In testimony whereof I have hereunto set my hand, this 13th day of June, 1905, in the presence of two attesting witnesses.

CHARLES S. SHARP.

Witnesses:
 ELMER W. STUPP,
 ALVIN E. FOSTER.